Patented Apr. 13, 1954

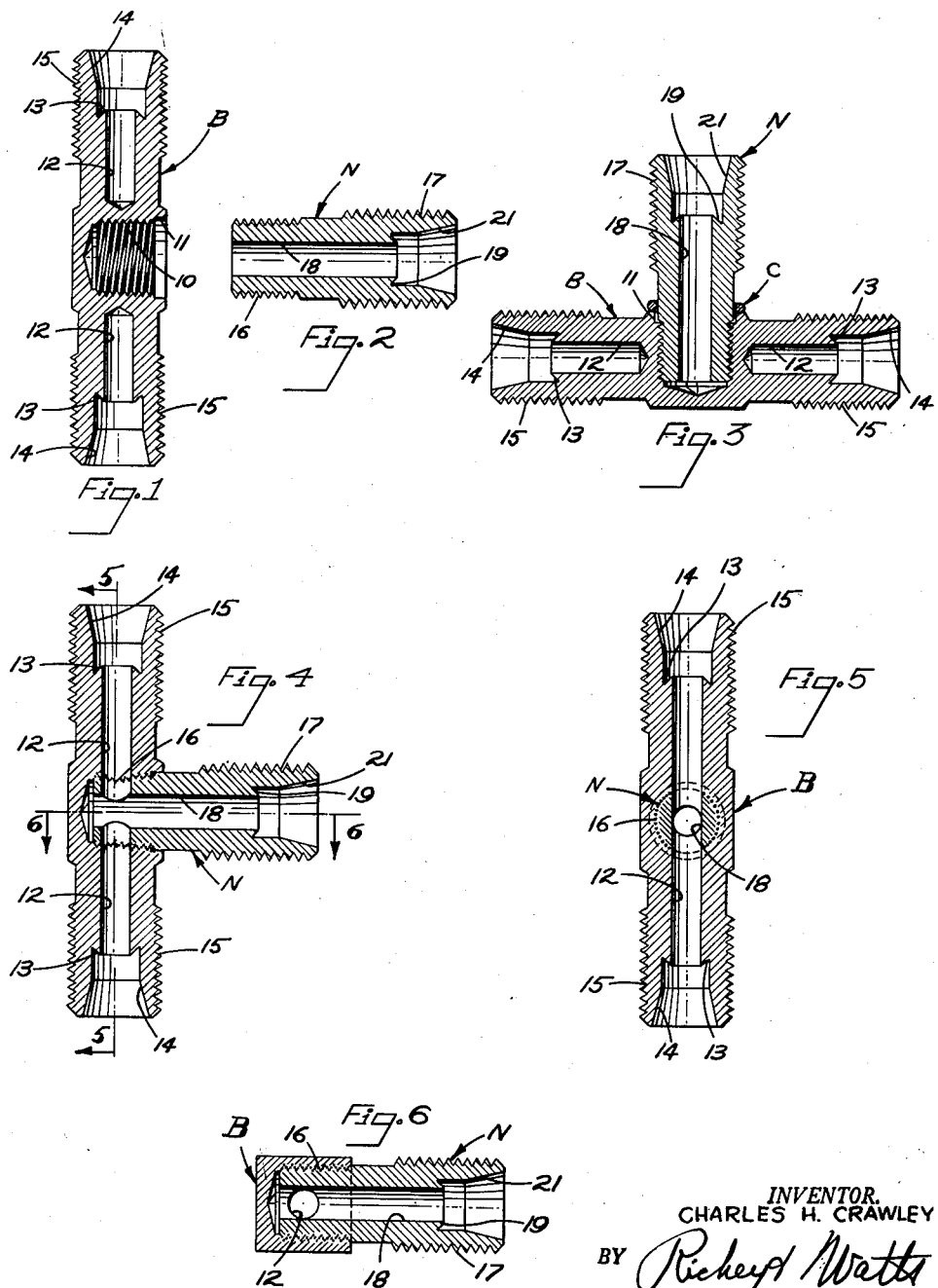

2,674,785

UNITED STATES PATENT OFFICE 2,674,785

METHOD OF MAKING FITTINGS

Charles H. Crawley, Euclid, Ohio, assignor to The Weatherhead Company, Cleveland, Ohio, a corporation of Ohio Application February 1, 1951, Serial No. 208,937

3 Claims. (Cl. 29—157)

1

This invention relates to fittings, and more particularly is concerned with new and useful improvements in angle and T-type fittings and methods of making such fittings. Fittings are currently sold in the trade, which will be referred to as angle fittings, for joining the ends of tubes or pipes at an angle to one another. Reference should be made to the co-pending application, Serial No. 207,002, filed January 20, 1951. This application contains article claims which define the fitting which would result from the manufacture according to the method claimed in the instant application as well as method claims drawn to another method of manufacturing the claimed article.

The economical production of relatively small tube or pipe fittings has presented some difficulty, particularly where high pressures are encountered in service. Accordingly, it has been common practice to make these fittings in one piece, by machining from the solid or by machining forgings or the like in order that the requisite resistance to high bursting pressures will be obtained. It has long been recognized that in some instances the most economical way to produce angle fittings is by the assembly of separately machined parts, such as screw machine parts, coupled with a welding or brazing operation to join these parts together. However, prior fittings embodying this construction have not been as strong as the more expensive forged-type fittings.

A principal object of the invention, therefore, resides in the economical production of brazed fittings having, even in the smaller sizes, the same strength and resistance to bursting pressures as a one-piece fitting. For example, in connection with production of a T-fitting, in the preferred form of the invention an elongated screw-machine body member has a pair of axially-aligned counterbores extending toward, but stopping short of, a right angle threaded counterbore. A nipple is threaded into the counterbore with the threads of the nipple extending past the axis of said pair of counterbores. A ring of brazing material is then placed at the intersection and the fitting passed though the usual hydrogen atmosphere brazing furnace, whereupon the brazing material, which is metal such as copper or the like, flows circumferentially and axially along the threaded joint. With this construction there is no interruption of the threaded joint to break the capillary action and so prevent the brazing material from flashing or flowing between the threads over their entire area.

The fitting is completed then by running a drill or similar cutting tool through one of the aligned counterbores and removing the material of the body and both sides of the nipple wall at its threaded portion. The completed fitting has the advantages, insofar as strength is concerned, of both the threaded and brazed-type joint, and yet due to the aforesaid method of forming the fitting the brazing material is completely disposed between all of the remaining threaded areas.

The manner in which these and other objects may be accomplished will be apparent from the following detailed description of a preferred embodiment of the invention.

In the drawings:

Fig. 1 is a section through the body member after it is machined;

Fig. 2 is a section through the nipple member;

Fig. 3 is a section through the assembled fitting before brazing;

Fig. 4 is a section through the completed fitting; and,

Figs. 5 and 6 are sections taken on 5—5 and 6—6 of Fig. 4 respectively.

The elongated body member B is preferably machined on an automatic lathe or screw machine from square or bar stock. It has an intermediate threaded counterbore 10 formed therein with an enlarged cylindrical outer portion 11. Although the invention, in its broader aspects, is not limited to the fabrication of T-fittings, in the form of the invention shown a T-fitting is readily and economically produced. A pair of axially aligned counterbores 12 are drilled in the body along its major axis, the axis of these bores being disposed at right angles to that of the threaded counterbore 10 and being within the axial confines of the counterbore threads. An inverted seat 13 for the end of a tube, and a tapered bore 14 are machined at each end of the body for cooperation with a pressure fitting and the end of the tubing, in the manner well known in the art. The ends of the body are externally threaded as at 15 for the reception of fitting nuts.

The nipple or tubular member N has a threaded shank part 16 matching the threads in the counterbore, these threads being the straight or machine-type of threads as opposed to the tapered or sealing-type of threads sometimes referred to as pipe threads. The nipple is externally threaded as at 17 for reception of a fitting nut, and has a fluid passageway 18 formed therein which communicates with a tubing seat 19 and a flare 21, these being typical and forming no part of the invention.

After the body and nipple parts are threaded together, the composite fitting is positioned as shown in Fig. 3, there being a ring C of brazing material, such as copper wire, disposed about the nipple and adjacent the threads thereon. These assemblies are then passed through a hydrogen atmosphere brazing furnace whereupon the brazing material C melts and flashes or flows axially and circumferentially between the threads, firmly bonding the parts together. Since the threads are not interrupted by the counterbores 12, a complete and perfect bond is obtained.

After the brazing operation has been completed, a drill or suitable cutting tool is run through one of the counterbores 12, thereby removing the material of the body as well as piercing diametrically opposite zones of the threaded shank part 16 of the nipple. The completed fitting now has a straight passage through the elongated body intersected by, and in fluid communication with, an angle passage 18 in the nipple.

The completed fitting has the combined structural advantages of both the threaded and bonded joints, and even though a portion of the wall of the tubular member is removed for fluid communication, this is not done at the detriment of the brazed joint. Although the wall sections are quite thin, particularly where the fittings are of a small dimension, due to the method of making the fitting the completed unit is as strong as a forged device or one machined from the solid. The completed fitting has a threaded shank on the nipple that extends well into the body of the fitting, past and across the intersecting bore, and even though this shank portion is interrupted by the bore it is, in its uninterrupted portion, perfectly bonded or brazed to the body part.

A fitting made in accordance with the invention is cheaper to produce than prior one-piece fittings, and is stronger than prior composite fittings. A fitting made in accordance with the invention, therefore, combines the advantages of the one-piece and the composite fittings without being subject to the disadvantages, in terms of cost of manufacture and strength of the completed unit, heretofore characteristic of prior devices.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. The method of fabricating a fitting comprising the steps of forming a fitting body having a threaded counterbore therein and another counterbore at an angle to said threaded counterbore and disposed intermediate the axial extent of the threads of said threaded counterbore but stopping short of the latter, threading a tubular threaded member into said threaded counterbore beyond the axis of said other counterbore, placing a ring of brazing material about said member adjacent said threads, passing said assembly through a brazing furnace causing molten brazing material to flow circumferentially and axially along said threads, and running a cutting tool through said other counterbore to remove metal from said body and a portion of the threaded shank part of said tubular member to complete the formation of an angular fluid passageway through said fitting, the diameter of the passageway formed by said cutting tool being less than the diameter of said threaded counterbore.

2. The method of fabricating a T-shaped fitting comprising the steps of forming a fitting body having a central threaded counterbore therein and a pair of axially-aligned counterbores at an angle to said threaded counterbore and with their axis disposed intermediate with the axial extent of the threads of said threaded counterbore, said aligned counterbores each stopping short of the threaded counterbore, threading a tubular threaded member into said threaded counterbore beyond the axis of the axially-aligned counterbores, placing a ring of brazing material about said member adjacent said threads, passing said assembly through a brazing furnace causing molten brazing material to flow circumferentially and axially along said threads, and running a cutting tool through one of said aligned counterbores and into the other to remove metal from said body and the threaded part of said tubular member to form a straight fluid passageway through said fitting intersected by another passageway, the diameter of the passageway formed by said cutting tool being less than the diameter of said threaded counterbore.

3. The method of fabricating a fitting comprising the steps of forming a fitting body having a first bore therein and a second bore at an angle to said first bore with its axis intermediate the length of said first bore but stopping short of the latter, inserting a closely fitting tubular member in said first bore beyond the axis of said second bore brazing the inserted walls of said tubular member to the engaged walls of said first bore, and boring a hole having a diameter less than the diameter of said first bore in axial continuation of said second bore into said first bore and through the wall of said tubular member to complete an angular passageway through said fitting.

References Cited in the file of this patent

UNITED STATES PATENTS

| Number | Name | Date |
|---|---|---|
| 1,851,031 | Baldwin | Mar. 29, 1932 |
| 2,088,321 | Follet | July 27, 1937 |
| 2,145,168 | Flagg | Jan. 24, 1939 |
| 2,257,427 | Parker | Sept. 30, 1941 |
| 2,528,280 | Lyon | Oct. 31, 1950 |
| 2,584,845 | Crawley | Feb. 5, 1952 |